United States Patent
Mizuno (10) Patent No.: US 10,310,545 B2
(45) Date of Patent: Jun. 4, 2019

(54) VEHICLE OPERATION SYSTEM

(71) Applicant: YAZAKI CORPORATION, Tokyo (JP)

(72) Inventor: Yoshiyuki Mizuno, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 421 days.

(21) Appl. No.: 15/064,210

(22) Filed: Mar. 8, 2016

(65) Prior Publication Data

US 2016/0266602 A1    Sep. 15, 2016

(30) Foreign Application Priority Data

Mar. 13, 2015   (JP) .................. 2015-050981

(51) Int. Cl.
    *B60Q 1/14*       (2006.01)
    *G05G 9/04*       (2006.01)

(52) U.S. Cl.
    CPC ............. *G05G 9/04* (2013.01); *B60Q 1/1476* (2013.01)

(58) Field of Classification Search
    CPC .............................. G05G 9/04; B60Q 1/1476
    See application file for complete search history.

(56) References Cited

U.S. PATENT DOCUMENTS

| | | | |
|---|---|---|---|
| 2012/0097508 A1* | 4/2012 | Son ................... | B60Q 1/00 200/18 |
| 2014/0375584 A1* | 12/2014 | Kaiser ............... | B60Q 1/1476 345/173 |
| 2015/0324006 A1 | 11/2015 | Mizuno | |
| 2015/0331494 A1 | 11/2015 | Mizuno | |
| 2016/0266602 A1* | 9/2016 | Mizuno ............... | G05G 9/04 |

FOREIGN PATENT DOCUMENTS

| | | | |
|---|---|---|---|
| FR | 2880145 A1 * | 6/2006 | ......... B60Q 1/1469 |
| JP | 2010-15880 A | 1/2010 | |
| JP | 2010-132258 A | 6/2010 | |
| JP | 2014-2996 A | 1/2014 | |
| JP | 2014-144693 A | 8/2014 | |
| JP | 2015-93493 A | 5/2015 | |
| WO | 2014/119584 A1 | 8/2014 | |

OTHER PUBLICATIONS

FR 2880145 translation.*
Japanese Office Action for the related Japanese Patent Application No. 2015-050981 dated Feb. 21, 2017.

* cited by examiner

*Primary Examiner* — Vicky A Johnson
(74) *Attorney, Agent, or Firm* — Kenealy Vaidya LLP (57) ABSTRACT

A vehicle operation system includes: a longitudinal member projected and extended from a steering column; an action detecting unit disposed at the longitudinal member's end in an extending direction and detects operation forms allocated to working forms of an onboard device; an auxiliary operation device disposed to the longitudinal member closer to the steering column than the action detecting unit is, including an annular member rotatable about the longitudinal member axis, and detecting the annular member's rotational operation forms allocated to working forms of the onboard device; and a controller controlling the onboard device based on the rotational operation forms detected by the auxiliary operation device and the operation forms by the action detecting unit. The action detecting unit includes a contact operation detecting region detecting the operation forms and a non-detecting region projecting in the extending direction beyond the contact operation detecting region and not detecting operation forms.

18 Claims, 7 Drawing Sheets

VEHICLE OPERATION SYSTEM

CROSS-REFERENCE TO RELATED APPLICATION(S)

The present application claims priority to and incorporates by reference the entire contents of Japanese Patent Application No. 2015-050981 filed in Japan on Mar. 13, 2015.

BACKGROUND OF THE INVENTION

1. Field of the Invention

The present invention relates to a vehicle operation system.

2. Description of the Related Art

Vehicle operation systems are used by operators to operate onboard devices installed in vehicles. Such a conventional vehicle operation system includes, for example, a lever operation unit provided to a steering column and a detecting unit provided at an end of the lever operation unit to detect the movement of a hand or a finger, so that the operator can operate the vehicle operation system without removing the hands from the steering wheel (see Japanese Patent Application Laid-open No. 2014-144693, for example). The detecting unit according to the technology disclosed in Japanese Patent Application Laid-open No. 2014-144693 is disposed at the end of the lever operation unit. When the detecting unit, which is configured to detect contact operations, detects a contact operation by the operator, it causes an onboard device to function. The lever operation unit also includes a rotational operation unit (knob) provided to a lever body thereof, and the operator can turn the rotational operation unit about the axis line of the lever body.

When the operator turns the rotational operation unit about the axis line of the lever body, the operator may unintentionally touch the detecting unit disposed at the end of the lever operation unit with a hand or a finger. If the detecting unit detects such an unintentional contact as a contact operation, the detecting unit causes the onboard device to function, which is not intended by the operator. Thus, the conventional vehicle operation system has room for improvement in terms of preventing the operator from unintentionally operating onboard devices.

SUMMARY OF THE INVENTION

It is an object of the present invention to provide a vehicle operation system that can prevent onboard devices from being unintentionally operated.

In order to achieve the above mentioned object, a vehicle operation system according to one aspect of the present invention includes a longitudinal member that is projected and extended from a steering column; an action detecting unit that is disposed at an end of the longitudinal member in an extending direction, and detects a contact operation as an operation form allocated to a working form that an onboard device has; a rotational action detecting unit that is disposed to the longitudinal member closer to the steering column than the action detecting unit is, includes a rotating member rotatably arranged about an axis line of the longitudinal member and surrounding the longitudinal member in a circumferential direction, and detects a rotational operation on the rotating member as a rotational operation form allocated to a working form that the onboard device has; and a controller that controls the onboard device in accordance with the operation form detected by the action detecting unit and the rotational operation form detected by the rotational action detecting unit, wherein the action detecting unit includes a contact operation detecting region in which the operation form is detected, and a non-detecting region that projects in the extending direction beyond the contact operation detecting region and in which the operation form is not detected.

According to another aspect of the present invention, in the vehicle operation system, it is desirable that the action detecting unit includes a contact sensor capable of detecting an object in contact with the contact operation detecting region and a direction in which the object moves, and detects the contact operation as the operation form with the contact sensor.

According to still another aspect of the present invention, in the vehicle operation system, it is desirable that the contact operation detecting region includes a first contact operation detecting region, a second contact operation detecting region, and a third contact operation detecting region each having a planar surface, the first contact operation detecting region is interposed between a pair of non-detecting regions, the second contact operation detecting region is disposed opposite to the first contact operation detecting region relative to one of the pair of the non-detecting regions, the third contact operation detecting region is disposed opposite to the first contact operation detecting region relative to the other one of the pair of the non-detecting regions, and the second contact operation detecting region and the third contact operation detecting region are each sloped in a direction away from the first contact operation detecting region toward the steering column.

According to still another aspect of the present invention, in the vehicle operation system, it is desirable that the action detecting unit includes the contact operation detecting region outwardly exposed at the end in the extending direction, and a movable member that is movable by the contact operation on the contact operation detecting region, and detects movement of the movable member as the operation form.

According to still another aspect of the present invention, in the vehicle operation system, it is desirable that at least a combination of the longitudinal member and the action detecting unit is provided to at least one of a left side and a right side of the steering column in a lateral direction of a vehicle.

According to still another aspect of the present invention, it is desirable that the vehicle operation system further includes a main operation device including a lever operation unit that includes the longitudinal member and a lever operation detecting unit that detects a tilt direction of the longitudinal member in a tilt action with an end of the longitudinal member close to the steering column as a fulcrum, the main operation device operating the onboard device or another onboard device different from the onboard device allocated to the tilt direction of the tilt action that corresponds to an operation direction of the longitudinal member; and an auxiliary operation device including the action detecting unit.

According to still another aspect of the present invention, in the vehicle operation system, it is desirable that at least one combination of the main operation device and the auxiliary operation device is provided to at least one of a left side and a right side of the steering column in a lateral direction of a vehicle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following fully describes a vehicle operation system according to an embodiment of the present invention with reference to the accompanying drawings. The embodiment is not intended to limit the scope of the present invention.

Embodiment

The vehicle operation system according to the embodiment of the present invention will be described with reference to FIGS. 1 to 6.

The vehicle operation system according to the present embodiment allows an operator (driver) to operate onboard devices installed in the vehicle without removing his/her hand from the steering wheel. The reference sign 1 in FIGS. 1 and 2 indicates the vehicle operation system described above.

Figure 1:
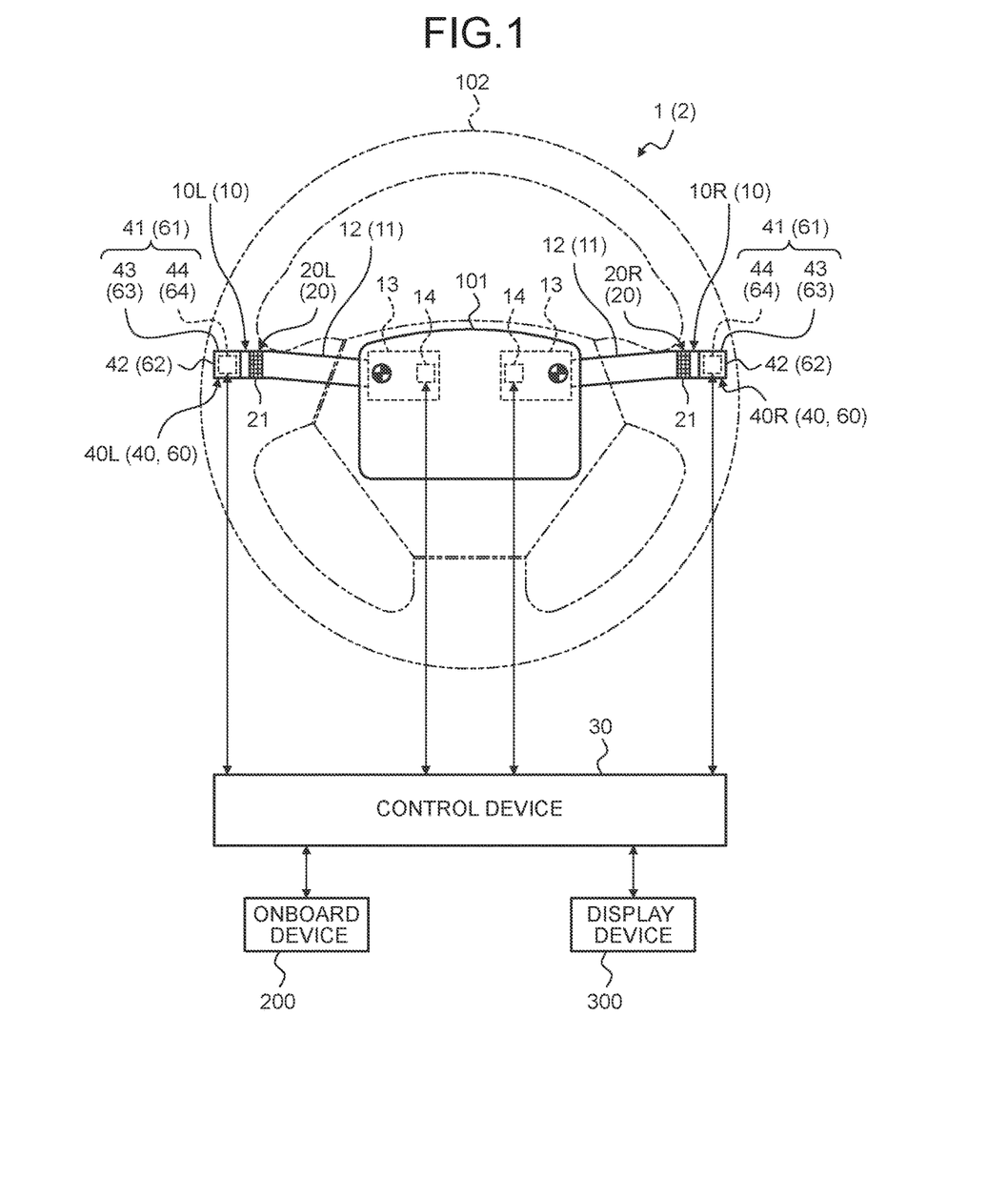
FIG. 1 is a schematic diagram illustrating a vehicle operation system according to an embodiment of the present invention.
Figure 2:
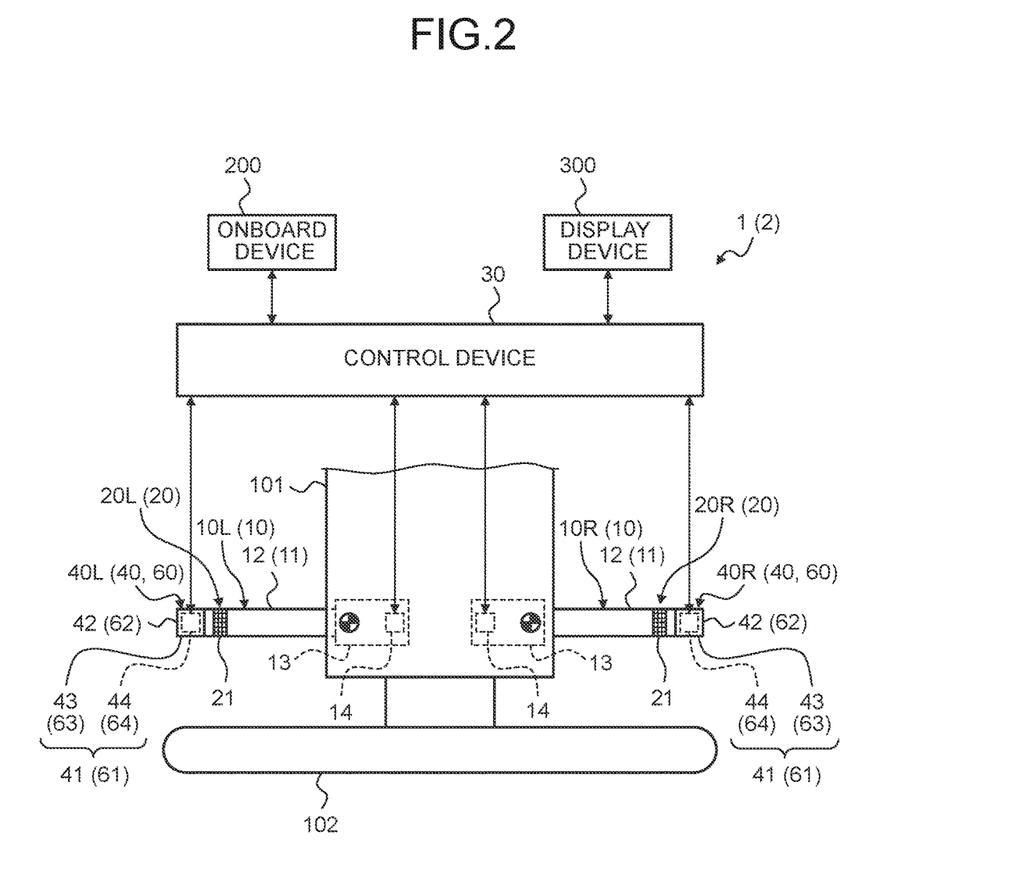
FIG. 2 is a block diagram illustrating a schematic configuration of the vehicle operation system.

The vehicle operation system 1 according to the present embodiment is provided to a steering column 101 inside the vehicle. Specifically, the vehicle operation system 1 is disposed at the back of a steering wheel 102, that is, disposed closer to the front side of the vehicle than the steering wheel 102 is disposed. The vehicle operation system 1 includes a main operation device 10 and an auxiliary operation device 20 for operating an onboard device 200, a control device (controller) 30, and an auxiliary operation device 40. The vehicle operation system 1 includes at least one combination of the main operation device 10, the auxiliary operation device 20, and the auxiliary operation device 40 provided to at least one of the left side and the right side of the steering column 101 in the lateral direction of the vehicle. In FIGS. 1 and 2, for example, a combination of a main operation device 10L, an auxiliary operation device 20L, and an auxiliary operation device 40L is provided to the left side of the steering column 101, and a combination of a main operation device 10R, an auxiliary operation device 20R, and an auxiliary operation device 40R is provided to the right side of the steering column 101.

The onboard device 200 has at least one function (working form) operative in accordance with the operation on the vehicle operation system 1 by the operator. Examples of the onboard device 200 include lighting devices (headlights and tail lights), direction indicators, and windshield wipers of the vehicle. Examples of the onboard device 200 also include devices inside the vehicle such as audio systems including audio devices and a radio, and an air-conditioner. Examples of the onboard device 200 further include devices that are not originally installed in the vehicle but are installed by the operator by bringing them to the vehicle, such as mobile phones and mobile audio players.

Hereinafter, unless otherwise specified, a direction parallel to the rotation axis of the steering wheel 102 is referred to as the axial direction, and a direction about the rotation axis is referred to as a circumferential direction. A direction orthogonal to the rotation axis is referred to as a radial direction.

Figure 3:
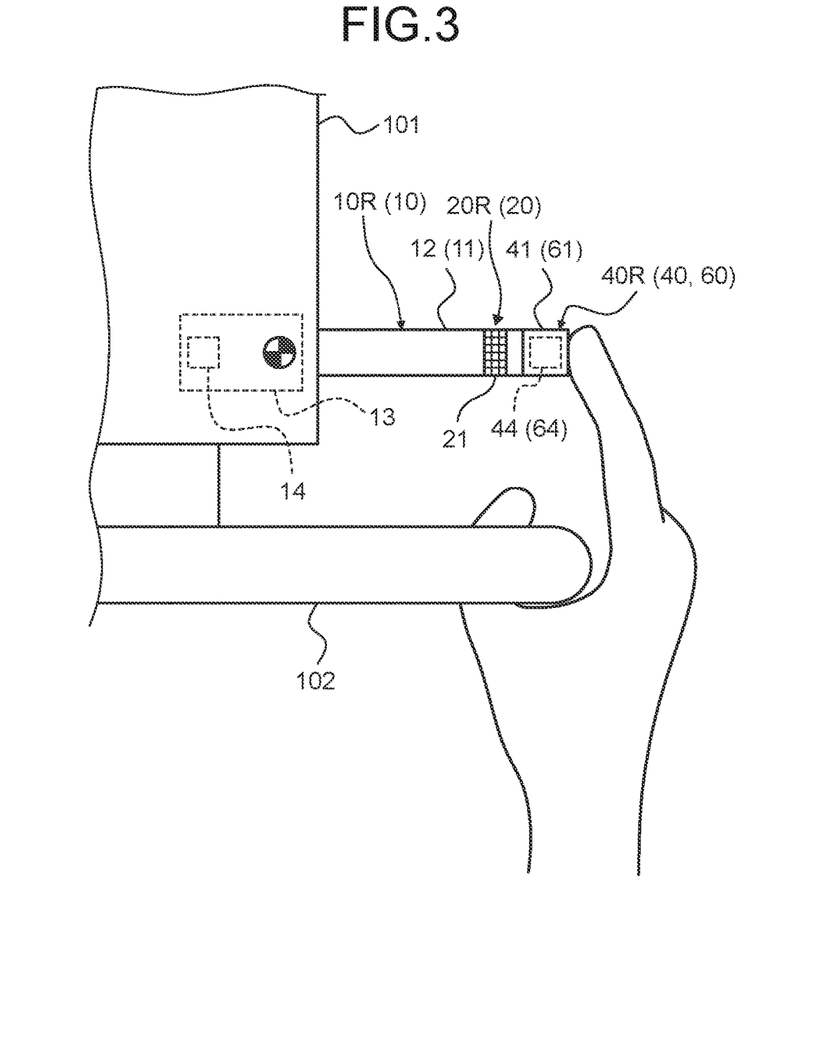
FIG. 3 is a schematic diagram illustrating a main operation device and an auxiliary operation device of the vehicle operation system.

As illustrated in FIG. 3, for example, the main operation device 10 includes a lever operation unit 11. The lever operation unit 11 includes a longitudinal member 12 projecting and extending from the steering column 101. The main operation device 10 is what is called a lever switch for operating the onboard device 200 (see FIG. 1) allocated to a direction of operation in which the longitudinal member 12 is operated.

Figure 4:
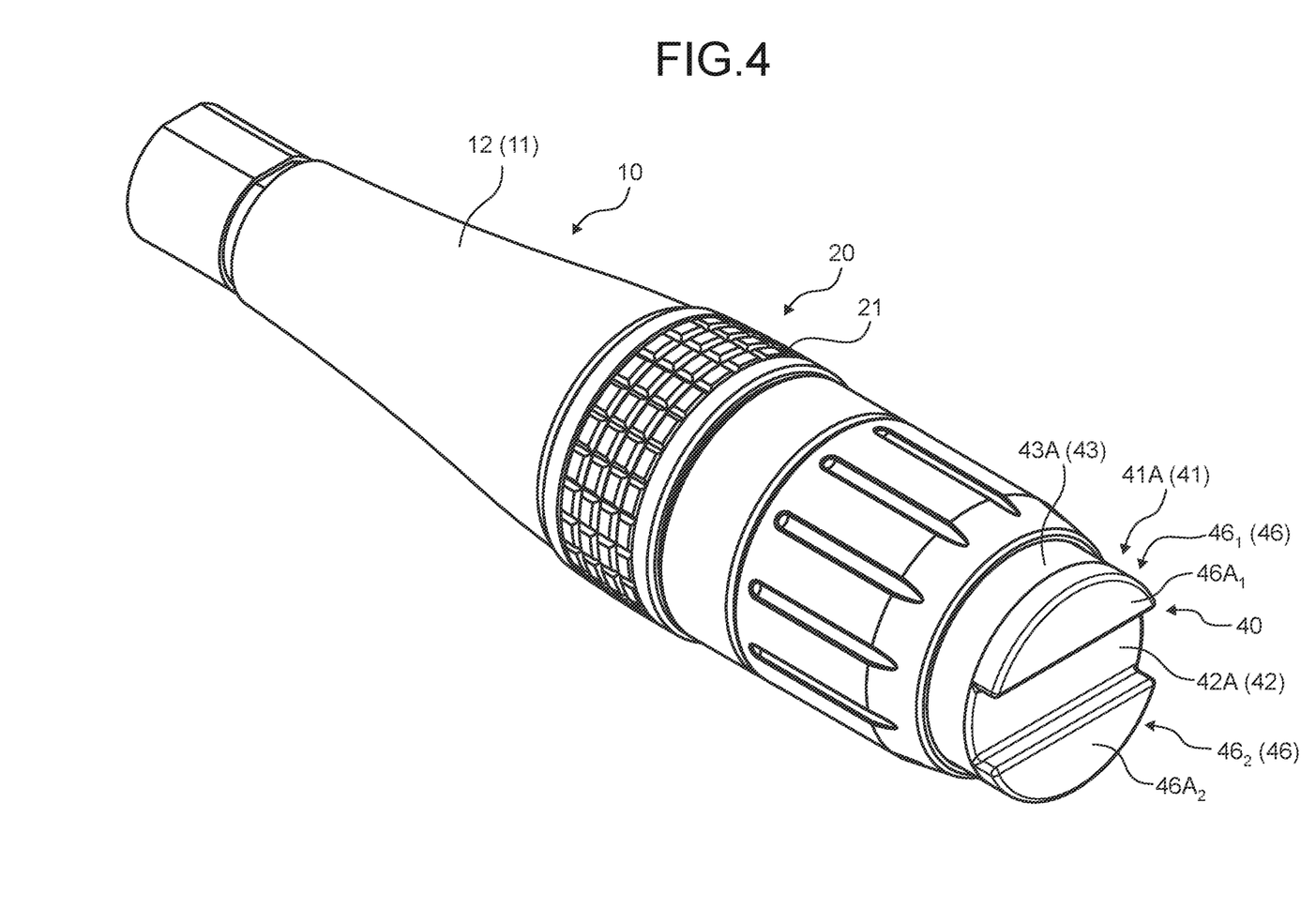
FIG. 4 is a perspective view illustrating the main operation device and the auxiliary operation device of the vehicle operation system.

As illustrated in FIG. 4, the longitudinal member 12 includes, for example, a cylindrical main body portion projecting from the steering column 101 in a certain direction. Examples of the certain direction include a radial direction, a direction slanting to the upper right of the vehicle, a direction slanting to the lower right of the vehicle, a direction slanting to the upper left of the vehicle, and a direction slanting lower left of the vehicle. Specifically, examples of the certain direction also include a direction tilted to the back of the vehicle with an end of the main body close to the steering column 101 as a fulcrum, for each direction described above. The main body portion of the longitudinal member 12 may be a straight body, or a curved body including a curved portion in the length of the main body portion. The end of the longitudinal member 12 in the projecting direction (extending direction) reaches a position that can be touched by a finger (such as the middle finger or forefinger) of the operator who is holding the left side or adjacent to the left side, or the right side or adjacent to the right side of the steering wheel 102 in the lateral direction of the vehicle. This configuration enables the operator to touch the end of the longitudinal member 12 in the projecting direction with a hand or a finger with the hands being kept on the steering wheel 102.

As illustrated in FIG. 3, for example, the longitudinal member 12 is tiltably supported by a support 13 fixed inside the steering column 101. The support 13 supports the longitudinal member 12 such that the longitudinal member can easily perform a tilt action with an end of the longitudinal member 12 close to the steering column 101 as a fulcrum. In the lever operation unit 11, a tilt direction of the longitudinal member 12 in a tilt action corresponds to a direction of operation in which the operator operates the longitudinal member 12. The longitudinal member 12 in this context can perform, with the neutral position being the original position, a tilt action toward the front of the vehicle, a tilt action toward the back of the vehicle, a clockwise tilt action in one circumferential direction, and a counterclockwise tilt action in the other circumferential direction. At least one onboard device 200 and at least one function of the onboard device 200 are allocated to each direction of operation of the longitudinal member 12.

The support 13 may return the longitudinal member 12 to the neutral position by, for example, spring action after the longitudinal member 12 is tilted in a certain direction of operation from the neutral position. The support 13 may also return the longitudinal member 12 to the neutral position by a manual operation by the operator after the longitudinal member 12 is tilted in a certain direction of operation from the neutral position. In the latter case, the support 13 supports the longitudinal member 12 such that the longitudinal member 12 can tilt to at least one step.

As illustrated in FIG. 3, for example, the main operation device 10 includes a lever operation detecting unit 14 that detects a tilt direction of the longitudinal member 12 in a tilt action. The lever operation detecting unit 14 transmits, to the control device 30, an output signal corresponding to the tilt direction of the longitudinal member 12. The control device 30 can detect the direction of operation in which the operator operates the longitudinal member 12 on the basis of the output signal.

The auxiliary operation device 20 that differs from the auxiliary operation device 40 to be described later is provided to the main operation device 10. The auxiliary operation device 20 is disposed to the longitudinal member 12 closer to the steering column 101 side than the auxiliary operation device 40 is. The auxiliary operation device 20 includes, for example, a coaxial annular member (rotating member) 21 disposed around the outer circumferential surface of the longitudinal member 12, and used to select a function of the onboard device 200 by being rotated about the axis line. As illustrated in FIG. 3, for example, the annular member 21 is provided with gaps and ridges alternately on the outer circumferential surface to prevent slippage when rotated.

The rotational direction of the annular member 21 in its rotational action corresponds to the direction of operation in which the operator operates the annular member 21. The annular member 21 can perform a rotational action in one direction and a rotational action in the other direction about the axis line of the longitudinal member 12. At least one onboard device 200 and at least one function of the onboard device 200 are allocated to each direction of operation of the annular member 21.

The auxiliary operation device 20 includes a rotational operation detecting unit (not illustrated) that detects the rotational direction in which the annular member 21 is rotated. The rotational operation detecting unit transmits an output signal corresponding to the rotational direction of the annular member 21 to the control device 30. The control device 30 can detect the direction of operation in which the operator operates the annular member 21 on the basis of the output signal.

The control device 30 transmits a command (drive command or stop command) to the onboard device 200 in accordance with the output signal from the lever operation detecting unit 14 to drive or stop a function of the onboard device 200 that corresponds to an operation performed by the operator on the longitudinal member 12. The control device 30 transmits a command to the onboard device 200 in accordance with the output signal from the rotational operation detecting unit to drive or stop a function of the onboard device 200 that corresponds to an operation performed by the operator on the annular member 21. The command to the onboard device 200 may directly cause the onboard device 200 to drive or stop, or may be directed to a control device of the onboard device 200. When the control device of the onboard device 200 receives a command from the control device 30, it causes the onboard device 200 to drive or stop a function of the onboard device 200 in accordance with the nature of the command.

The auxiliary operation device 40 is a switch for operating the same onboard device 200 as that the main operation device 10 operates but for operating other functions thereof, or for operating a different onboard device 200 that is not operated by the main operation device 10. A plurality of operation forms for operating the onboard device 200 are set in the auxiliary operation device 40. The operation forms represent the operator's intension to operate the onboard device 200. At least one onboard device 200 and at least one function of the onboard device 200 are allocated to each operation form.

The auxiliary operation device 40 includes an action detecting unit 41 disposed at an end of the longitudinal member 12 in the projecting direction. The action detecting unit 41 detects the operation forms set in the auxiliary operation device 40. The action detecting unit 41 detects an operation form corresponding to an operator's intention to operate the onboard device 200 at the end of the longitudinal member 12.

Specifically, the action detecting unit 41 according to the present embodiment includes at least one contact operation region 42 on which the operator performs contact operations. The contact operation region 42 is formed on a contact operation member 43 disposed at the end of the longitudinal member 12. The contact operation member 43 includes an exposed portion that can be touched by the operator. The contact operation region 42 is formed on this exposed portion. For example, the action detecting unit 41 includes one contact operation member 43 when it has one contact operation region 42. When the action detecting unit 41 has a plurality of contact operation regions 42, the contact operation regions 42 may be formed on one contact operation member 43, or may be formed on contact operation members 43 prepared for the respective contact operation regions 42.

The action detecting unit 41 includes a contact sensor 44 that can detect an object in contact with the contact operation region 42 and the direction in which the object moves. The contact sensor 44 is, for example, what is called a touch sensor such as a capacitance sensor. The contact sensor 44 is disposed on the outer surface or the inner surface of the exposed portion of the contact operation member 43. The contact sensor 44 in this context is disposed on the inner surface of the exposed portion, and detects operation forms (hereinafter referred to as contact operation forms) performed by the operator on the contact operation region 42 of the contact operation member 43. The contact sensor 44 may be provided to each contact operation region 42 one by one, or may be shared by a plurality of contact operation regions 42.

The control device 30 transmits a command (drive command or stop command) to the onboard device 200 in accordance with the output signal from the contact sensor 44 of the action detecting unit 41 to drive or stop a function of the onboard device 200 that corresponds to a contact operation performed by the operator on the contact operation region 42. The command to the onboard device 200 is the same as the one described above.

In the action detecting unit 41 described above, at least one contact operation form performed by the operator is allocated to one contact operation region 42. In the action detecting unit 41, the contact operation forms performed by the operator on the contact operation region 42 are allocated to the respective functions of the onboard device 200, or to a plurality of onboard devices 200.

FIG. 4 specifically illustrates an example of the action detecting unit 41 having one contact operation region 42.

For example, an action detecting unit 41A in FIG. 4 includes a contact operation member 43A having a cylindrical shape with a blocking surface at an end, and disposed at the end of the cylindrical main body of the longitudinal member 12 to block an opening thereof. In this case, the circular blocking surface that is an exposed portion of the contact operation member 43A is a contact operation region 42A. The contact operation region 42A is located at the left side or adjacent to the left side, or at the right side or adjacent to the right side of the steering wheel 102 in the lateral direction of the vehicle. This configuration allows the action detecting unit 41A to detect the operation forms allocated to the contact operation region 42A while the operator is holding the steering wheel 102.

The action detecting unit 41A includes the contact sensor 44 disposed on the inner surface of the contact operation region 42A. The blocking surface in this context is a flat surface orthogonal to the axial direction of the end of the main body. Examples of the contact operation forms set in the contact operation region 42A include a slide operation along a radial direction of the blocking surface, and a touch operation on the contact operation region 42A. The slide operation can be used for, for example, a function selecting operation in which the operator selects a desired function from a plurality of functions of the onboard device 200, and a condition selecting operation in which the operator selects a desired condition from a plurality of conditions of a certain function. When the onboard device 200 is an audio system, for example, the function selecting operation is performed to select a desired function from functions such as a media selecting function, a volume selecting function, and a track selecting function. When the volume selecting function is selected, for example, the condition selecting operation is performed to select a desired volume. The slide operation includes at least a unidirectional operation. The touch operation is performed, for example, to determine a function or a condition selected by the slide operation. The touch operation includes a touch operation touching the contact operation region 43A once, and a touch operation touching the contact operation region 43A a plurality of times.

The action detecting unit 41A includes a non-detecting part 46 projecting in the extending direction at the end of the longitudinal member 12 beyond the contact operation region 42A. The non-detecting part 46 is made of a member different from the one on which the contact operation region 42A is formed. The non-detecting part 46 covers a part of the blocking surface. The non-detecting part 46 includes two non-detecting parts $46_1$ and $46_2$. The non-detecting part $46_1$ is disposed at an upper position relative to the contact operation region 42A in the vertical direction of the vehicle. The non-detecting part $46_1$ has a semicircular cross-sectional shape defined by one straight side close to the contact operation region 42A extending along the natural course of the movement of a hand or a finger of the operator, and by a curved line connecting with both ends of the straight side and curving in the upward direction of the vehicle. The non-detecting part $46_1$ has a thickness in the extending direction of the longitudinal member 12. The curved line has a curvature corresponding to the curvature of the blocking surface of the contact operation member 43A. The contact sensor 44 does not detect an object in contact with the non-detecting part $46_1$. The non-detecting part $46_1$ includes a non-detecting region $46A_1$ provided on an end thereof in the extending direction. The non-detecting part $46_2$ is disposed at a lower position relative to the contact operation region 42A in the vertical direction of the vehicle. The non-detecting part $46_2$ has a semicircular cross-sectional shape defined by one straight side close to the contact operation region 42A extending along the natural course of the movement of a hand or a finger of the operator, and by a curved line connecting with both ends of the straight side and curving in the downward direction of the vehicle. The non-detecting part $46_2$ has a thickness in the extending direction of the longitudinal member 12. The curved line has a curvature corresponding to the curvature of the blocking surface of the contact operation member 43A. The contact sensor 44 does not detect an object in contact with the non-detecting part $46_2$. The non-detecting part $46_2$ includes a non-detecting region $46A_2$ provided on an end thereof in the extending direction.

As described above, the non-detecting regions $46A_1$ and $46A_2$ are provided at the end of the longitudinal member 12. With this configuration, when the operator operates the auxiliary operation device 20 with the hand or fingers covering the end of the longitudinal member 12, the hand or fingers touch the non-detecting regions $46A_1$ and $46A_2$, thereby preventing the hand or fingers from touching the contact operation region 42A.

The auxiliary operation device 40 including the action detecting unit 41A can be used as at least one of the auxiliary operation devices 40L and 40R described above.

Figure 5:
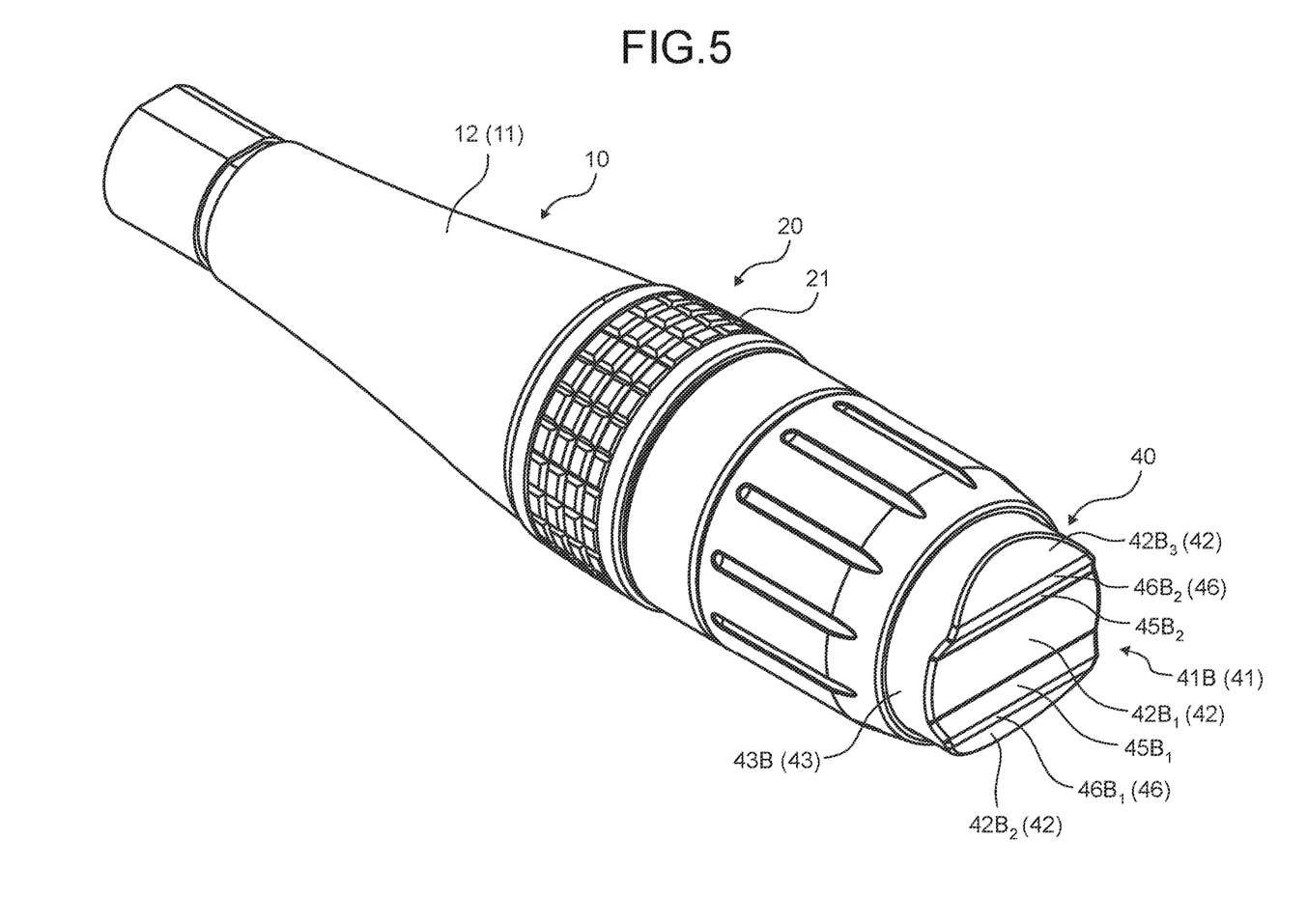
FIG. 5 is another perspective view illustrating the main operation device and the auxiliary operation device of the vehicle operation system.
Figure 6:
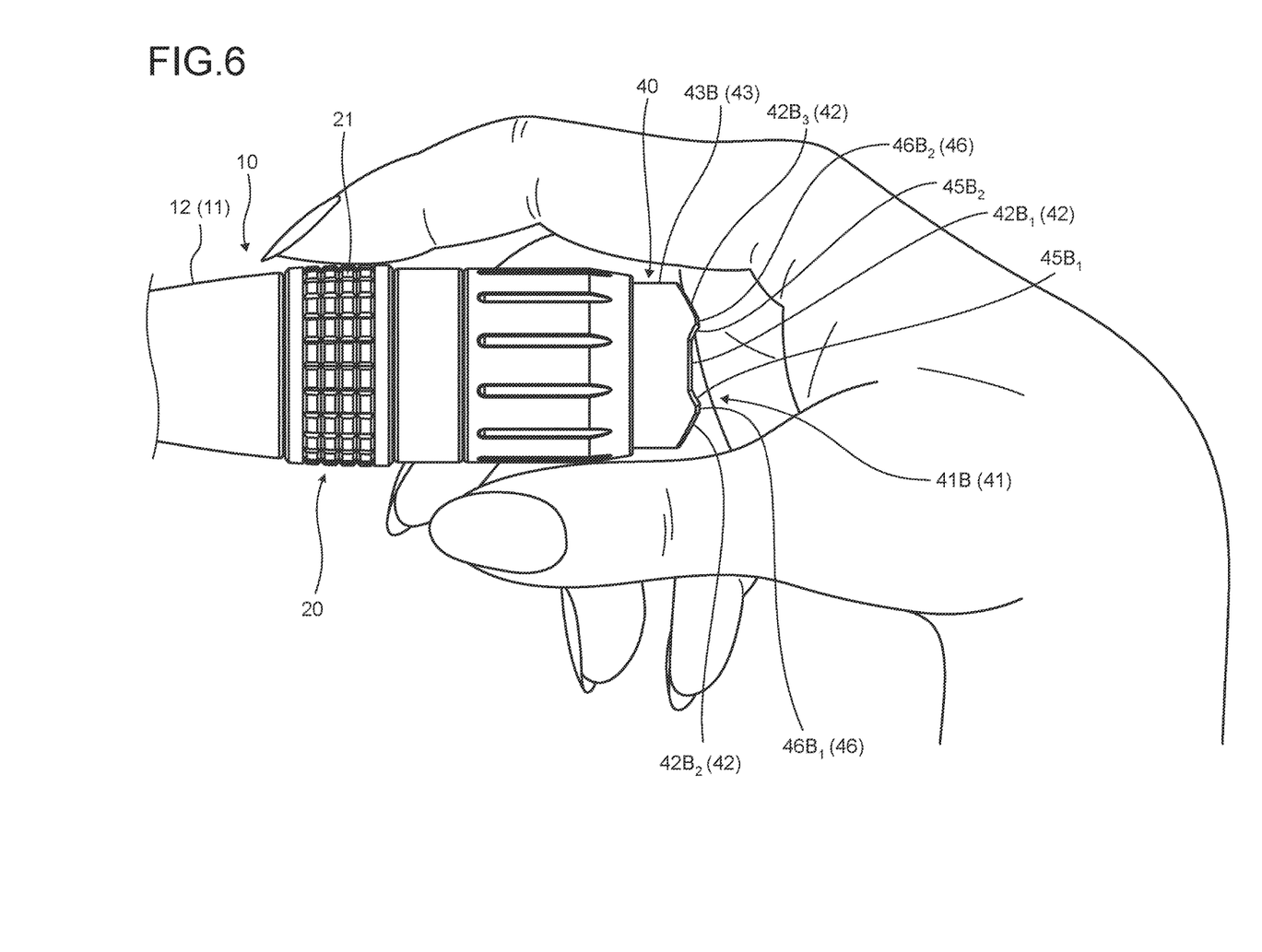
FIG. 6 is a front view illustrating the main operation device and the auxiliary operation device of the vehicle operation system.

FIGS. 5 and 6 specifically illustrate an example of an action detecting unit 41B including a plurality of contact operation regions 42.

The contact operation regions 42 may be made, for example, by dividing one contact operation region 42 into segments. In this case, the contact sensor 44 may be arranged on the entire surface of the contact operation region 42 so that the contact sensor 44 can receive the contact operations thereon, and configured to detect a contact operation on each segment. When the contact operation region 42 includes a plurality of contact operation regions 42, a desirable arrangement of the contact operation regions 42 is that they are arranged in the direction orthogonal to the natural course of the movement of a hand or a finger of the operator so that the operator finds it easier to perform the slide operation. In this context, the contact operation regions 42 are each arranged parallel to the flat surface of the contact operation region 42A and are separately arranged in the direction orthogonal to the natural course of the movement of a hand or a finger of the operator.

The action detecting unit 41B includes first, second, and third contact operation regions (first, second, and third action detecting units) $42B_1$, $42B_2$, and $42B_3$. In this context, the first, the second, and the third contact operation regions $42B_1$, $42B_2$, and $42B_3$ are formed on one contact operation member 43B. The contact operation member 43B is a cylindrical member disposed at the end of the longitudinal member 12, and an opening at an end of the contact operation member 43B is blocked by the first, the second, and the third contact operation regions $42B_1$, $42B_2$, and $42B_3$ that are exposed portions. The first, the second, and the third contact operation regions $42B_1$, $42B_2$, and $42B_3$ in this context are separately disposed at the direction orthogonal to the natural course of the movement of a hand or a finger of the operator, and each region has a flat surface extending along the course of the movement. In the action detecting unit 41B, the contact sensor 44 is disposed on the inner surface of the first, the second, and the third contact operation regions $42B_1$, $42B_2$, and $42B_3$.

The first contact operation region $42B_1$ is interposed between the second contact operation region $42B_2$ and the third contact operation region $42B_3$. The first contact operation region $42B_1$ is a flat surface orthogonal to the axial direction of the end of the longitudinal member 12, and extends along the natural course (in this case, the bending and stretching direction) of the movement of a hand or a finger of the operator. The first contact operation region $42B_1$ is defined by two parallel straight sides extending along the course of the hand or finger movement, and by two sides connecting with the two straight sides at both ends of the course of the hand or finger movement (at an end in the stretching position and an end in the bending position). The two sides at both ends have a curvature corresponding to the curvature of the cylindrical shape of the contact operation member 43B. At least a slide operation along the course of the hand or finger movement is set as a contact operation form in the first contact operation region $42B_1$. A touch operation is also set as a contact operation form in the first contact operation region $42B_1$ in this context.

The second contact operation region $42B_2$ is disposed at an upper position relative to the first contact operation region $42B_1$ in the vertical direction of the vehicle. The second contact operation region $42B_2$ is a flat surface sloped relative to the first contact operation region $42B_1$ and extending along the natural course of the movement of a hand or a finger of the operator. The second contact operation region $42B_2$ is sloped relative to the first contact operation region $42B_1$ in the upward direction of the vehicle toward the steering column 101. In other words, the second contact operation region $42B_2$ in this context has a sloped surface like a surface made by cutting off a part of the circumferential edge of a disc-shaped member. The second contact operation region $42B_2$ is defined by one straight side close to the first contact operation region $42B_1$ extending along the natural course of the movement of a hand or a finger of the operator, and by a curved line connecting with both ends of the straight side and curving in the upward direction of the vehicle. The curved line has a curvature corresponding to the curvature of the cylindrical shape of the contact operation member 43B. At least a touch operation is set as a contact operation form in the second contact operation region $42B_2$. A slide operation along the course of the hand or finger movement may be set as a contact operation form in the second contact operation region $42B_2$.

The third contact operation region $42B_3$ is disposed at a lower position relative to the first contact operation region $42B_1$ in the vertical direction of the vehicle. The third contact operation region $42B_3$ is a flat surface sloped relative to the first contact operation region $42B_1$ and extending along the natural course of the movement of a hand or a finger of the operator. The third contact operation region $42B_3$ is sloped relative to the first contact operation region $42B_1$ in the downward direction of the vehicle toward the steering column 101. In other words, the third contact operation region $42B_3$ in this context, as in the case of the second contact operation region $42B_2$, has a sloped surface like a surface made by cutting off a part of the circumferential edge of a disc-shaped member. The third contact operation region $42B_3$ is defined by one straight side close to the first contact operation region $42B_1$ extending along the course of the hand or finger movement, and by a curved line connecting with both ends of the straight side and curving in the downward direction of the vehicle. The curved line has a curvature corresponding to the curvature of the cylindrical shape of the contact operation member 43B. At least a touch operation is set as a contact operation form in the third contact operation region $42B_3$. A slide operation along the course of the hand or finger movement may be set as a contact operation form in the third contact operation region $42B_3$.

The first contact operation region $42B_1$ is recessed toward the steering column 101 relative to the second contact operation region $42B_2$ and the third contact operation region $42B_3$. In other words, the contact operation member 43B includes a difference in level between the first contact operation region $42B_1$ and the second contact operation region $42B_2$, and between the first contact operation region $42B_1$ and the third contact operation region $42B_3$. Thus, a joint surface $45B_1$ is formed between the first contact operation region $42B_1$ and the second contact operation region $42B_2$, and a joint surface $45B_2$ is formed between the first contact operation region $42B_1$ and the third contact operation region $42B_3$.

Furthermore, a first non-detecting region $46B_1$ is interposed between the second contact operation region $42B_2$ and the joint surface $45B_1$. The first non-detecting region $46B_1$ projects in the extending direction at the end of the longitudinal member 12 beyond the first, the second, and the third contact operation regions $42B_1$, $42B_2$, and $42B_3$. A second non-detecting region $46B_2$ is interposed between the third contact operation region $42B_3$ and the joint surface $45B_2$. The second non-detecting region $46B_2$ projects in the extending direction at the end of the longitudinal member 12 beyond the first, the second, and the third contact operation regions $42B_1$, $42B_2$, and $42B_3$.

A contact sensor 44B may be configured to detect an object in contact with the joint surfaces $45B_1$ and $45B_2$, or may be configured not to detect such an object. In the former case, the joint surfaces $45B_1$ and $45B_2$ can be used as, for example, a part of the first contact operation region $42B_1$. The contact sensor 44B does not detect an object in contact with the first non-detecting region $46B_1$ or the second non-detecting region $46B_2$.

As described above, the first non-detecting regions $46B_1$ and $46B_2$ are disposed at the end of the longitudinal member 12. With this configuration, when the operator operates the auxiliary operation device 20 with the hand or fingers covering the end of the longitudinal member 12 as illustrated in FIG. 6, the hand or fingers touch the first non-detecting regions $46B_1$ and $46B_2$, thereby preventing the hand or fingers from touching the first, the second, and the third contact operation regions $42B_1$, $42B_2$, and $42B_3$.

In the action detecting unit 41B, when the operator tries to perform a contact operation on the first contact operation region $42B_1$, the operator may unintentionally touch the second contact operation region $42B_2$ or the third contact operation region $42B_3$ together with the first contact operation region $42B_1$ depending on the size of the hand or the fingers. To prevent this situation, for example, the control device 30 determines that the operator has performed a contact operation on the first contact operation region $42B_1$ if the control device 30 receives an output signal from the contact sensor 44B relating to the first contact operation region $42B_1$ and the detected region of the first contact operation region $42B_1$ in the output signal is equal to or larger than a certain region, although the control device 30 has also received output signals from the contact sensor 44B relating to the second contact operation region $42B_2$ and the third contact operation region $42B_3$.

The auxiliary operation device 40 including the action detecting unit 41B can be used as at least one of the auxiliary operation devices 40L and 40R. When, for example, the auxiliary operation device 40 including the action detecting unit 41A illustrated in FIG. 4 is used as the auxiliary operation device 40L, the auxiliary operation device 40 including the action detecting unit 41B may be used as the auxiliary operation device 40L.

As described above, the action detecting unit 41 includes the non-detecting region 46 projecting in the extending direction at the end of the longitudinal member 12 beyond the contact operation region 42. When the operator operates the auxiliary operation device 20 with the palm covering the end of the longitudinal member 12, the hand or fingers touch the non-detecting region 46 before touching the contact operation region 42. Thus, the vehicle operation system 1 can prevent a hand or a finger from touching the contact operation region 42 even if the operator performs operation with the palm covering the end of the longitudinal member 12. In other words, this configuration can prevent the onboard device 200 from being unintentionally operated by an unintentional contact on the contact operation region 42 by a hand or a finger of the operator. Thus, the vehicle operation system 1 can prevent the operator from unintentionally operating the onboard device 200.

The second contact operation region $42B_2$ and the third contact operation region $42B_3$ each have a sloped surface like a surface made by cutting off a part of the circumferential edge of a disc-shaped member. This configuration further prevents the operator from touching the second contact operation region $42B_2$ and the third contact operation region $42B_3$ with a hand or a finger if the operator operates the auxiliary operation device 20 with the palm covering the end of the longitudinal member 12.

As described above, the vehicle operation system 1 according to the present embodiment can prevent the onboard device 200 from being unintentionally operated.

Modification

Figure 7:
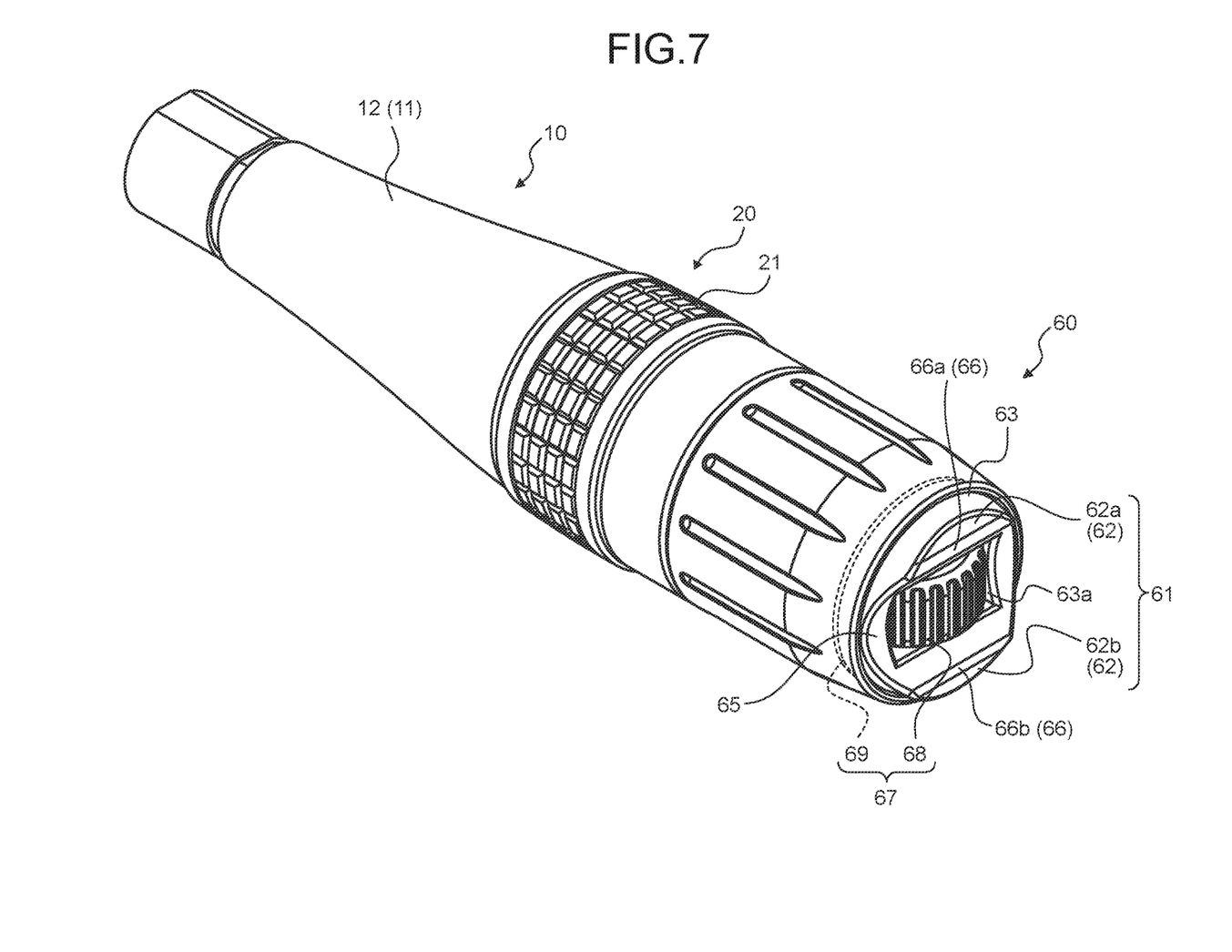
FIG. 7 is a perspective view illustrating a main operation device and an auxiliary operation device of a vehicle operation system according to a modification.

A vehicle operation system 2 according to a modification differs from the vehicle operation system 1 according to the embodiment in that the auxiliary operation device 40 is replaced with an auxiliary operation device 60 illustrated in FIG. 7. A plurality of operation forms for operating the onboard device 200 are set in the auxiliary operation device 60 as in the case of the auxiliary operation device 40 in the embodiment.

The auxiliary operation device 60 includes a first action detecting unit 61 that is the same as the one included in the auxiliary operation device 40 in the embodiment and a second action detecting unit 67 that is not included in the auxiliary operation device 40, and are disposed at the end of the longitudinal member 12 in the extending direction.

The first action detecting unit 61 according to the present modification includes a contact operation region 62 that is the same as the one included in the action detecting unit 41 in the embodiment. In this context, the contact operation region 62 includes a first contact operation region 62a and a second contact operation region 62b. The first contact operation region 62a and the second contact operation region 62b are formed on an exposed portion of a contact operation member 63. The contact operation member 63 has a cylindrical shape as in the case of the contact operation member 43A illustrated in FIG. 4 in the embodiment, but has a rectangular through hole 63a in the center of a circular blocking surface that is the exposed portion. A desirable arrangement of the through hole 63a is that the longitudinal direction thereof extends along the natural course of the movement of a hand or a finger of the operator as described in the embodiment. A contact sensor 64 that is the same as the contact sensor 44 in the embodiment is disposed on the outer surface or the inner surface of the exposed portion of the contact operation member 63. The contact sensor 64 includes a contact sensor 64a for the first contact operation region 62a and a contact sensor 64b for the second contact operation region 62b.

The first contact operation region 62a is disposed at an upper position relative to the through hole 63a in the vertical direction of the vehicle. The first contact operation region 62a is defined by one straight side close to the through hole 63a extending along the natural course of the movement of a hand or a finger of the operator, and by a curved line connecting with both ends of the straight side and curving in the upward direction of the vehicle. The curved line has a curvature corresponding to the curvature of the cylindrical shape of the contact operation member 63. The contact sensor 64a is disposed on the inner surface of the first contact operation region 62a. At least a touch operation is set as a contact operation form in the first contact operation region 62a. For example, the operator can use the first contact operation region 62a as a decision button by performing a touch operation (by touching the contact operation region 62a once) as in the case of the second contact operation region $42B_2$ in the embodiment. A slide operation along the course of the hand or finger movement of the operator may be set as a contact operation form in the first contact operation region 62a.

The second contact operation region 62b is disposed at a lower position relative to the through hole 63a in the vertical direction of the vehicle. The second contact operation region 62b is defined by one straight side close to the through hole 63a extending along the natural course of the movement of a hand or a finger of the operator, and by a curved line connecting with both ends of the straight side and curving in the downward direction of the vehicle. The curved line has a curvature corresponding to the curvature of the cylindrical shape of the contact operation member 63. The contact sensor 64b is disposed on the inner surface of the second contact operation region 62b. At least a touch operation is set as a contact operation form in the second contact operation region 62b. For example, the operator can use the second contact operation region 62b as a return button by performing a touch operation (by touching the second contact operation region 62b once) as in the case of the third contact operation region $42B_3$ in the embodiment. A slide operation along the course of the hand or finger movement of the operator may be set as a contact operation form in the second contact operation region 62b.

The second action detecting unit 67 includes a disc-shaped dial operation member (movable member, contact operation detecting region) 68, and a dial operation detecting unit 69 for detecting the movement of the disc-shaped dial operation member 68. The second action detecting unit 67 is used like what is called a tilt wheel.

The second action detecting unit 67 is recessed toward the steering column 101 relative to the first contact operation region 62a and the second contact operation region 62b. In other words, the second action detecting unit 67 is disposed at a position corresponding to a position at which the first contact operation region $42B_1$ in the embodiment is disposed. Specifically, the auxiliary operation device 60 includes a difference in level between the first contact operation region 62a and the second action detecting unit 67, and between the second contact operation region 62b and the second action detecting unit 67. Thus, a joint surface 65 having a curved surface is formed between the first contact operation region 62a and the second action detecting unit 67, and between the second contact operation region 62b and the second action detecting unit 67. Furthermore, a first non-detecting region 66a is interposed between the first contact operation region 62a and the joint surface 65. The first non-detecting region 66a projects in the extending direction at the end of the longitudinal member 12 beyond the first contact operation region 62a and the second contact operation region 62b. A second non-detecting region 66b is interposed between the second contact operation region 62b and the joint surface 65. The second non-detecting region 66b projects in the extending direction at the end of the longitudinal member 12 beyond the first contact operation region 62a and the second contact operation region 62b. The contact sensors 64a and 64b may be configured to detect an object in contact with the joint surface 65, or may be configured not to detect such an object. In the former case, the joint surface 65 may be used, for example, as a part of the first contact operation region 62a. The contact sensors 64a and 64b do not detect an object in contact with the first non-detecting region 66a or the second non-detecting region 66b.

The disc-shaped dial operation member 68 is arranged such that the axis line (axis of rotation) of the disc-shaped dial operation member 68 is orthogonal to the axial direction of the end of the longitudinal member 12 with a part of the outer circumferential surface of the disc-shaped dial operation member 68 being exposed from the through hole 63a to rotate about the axis line in a direction along the longitudinal direction of the through hole 63a. The first non-detecting region 66a and the second non-detecting region 66b of the first action detecting unit 61 project in the extending direction beyond an end of the disc-shaped dial operation member 68. The disc-shaped dial operation member 68 is rotatably held in, for example, the contact operation member 63. The exposed portion of the disc-shaped dial operation member 68 from the through hole 63a is used by the operator as a contact operation part. To prevent slippage during contact operation, the outer circumferential surface of the disc-shaped dial operation member 68 is provided with gaps and ridges alternately along the circumferential direction. The disc-shaped dial operation member 68 can be pressed in the axial direction of the end of the longitudinal member 12. When the disc-shaped dial operation member 68 is pressed, it can return to the original position by an elastic member (not illustrated) mounted on, for example, the axis of rotation or a support of the axis of rotation.

A rotational operation of the disc-shaped dial operation member 68 about the axis line can be used as a slide operation on the first contact operation region 42B$_1$ in the embodiment. A push operation on the disc-shaped dial operation member 68 can be used as, for example, a decision operation on the selected function of the onboard device 200.

The dial operation detecting unit 69 detects an amount of rotation of the disc-shaped dial operation member 68 (rotation angles, for example) and presence or absence of a push operation on the disc-shaped dial operation member 68. The dial operation detecting unit 69 transmits an output signal relating to the amount of rotation and presence or absence of the push operation to the control device 30.

The control device 30 controls the onboard device 200 in accordance with the output signals from the contact sensors 64a and 64b, and the dial operation detecting unit 69.

The auxiliary operation device 60 can be used as at least one of the auxiliary operation devices 40L and 40R described in the embodiment. In the vehicle operation system 2 in this case, for example, the operator may hold down the disc-shaped dial operation member 68 for a certain time period or may keep a finger on the first contact operation region 62a or the second contact operation region 62b for a certain time period to perform a drive operation form corresponding to the drive command or a stop operation form corresponding to the stop command described in the embodiment. The vehicle operation system 2 may include the auxiliary operation device 60 as one of the auxiliary operation devices 40L and 40R, and include the auxiliary operation device 40 including the action detecting unit 41A or the action detecting unit 41B in the embodiment as the other one of the auxiliary operation devices 40L and 40R.

As described above, the first and the second non-detecting regions 66a and 66b project in the extending direction at the end of the longitudinal member 12 beyond the first and the second contact operation regions 62a and 62b and the disc-shaped dial operation member 68. This configuration allows a hand or a finger of the operator to touch the first and the second non-detecting regions 66a and 66b before touching the first and the second contact operation regions 62a and 62b and the disc-shaped dial operation member 68 if the operator operates the auxiliary operation device 20 with the palm covering the end of the longitudinal member 12. Thus, the vehicle operation system 2 can prevent a hand or a finger from touching the first and the second contact operation regions 62a and 62b and the disc-shaped dial operation member 68 even if the operator performs operation with the palm covering the end of the longitudinal member 12. In other words, this configuration can prevent the onboard device from being unintentionally operated by an unintentional contact on the first and the second contact operation regions 62a and 62b and the disc-shaped dial operation member 68 by a hand or a finger of the operator. Thus, the vehicle operation system 2 can prevent the operator from unintentionally operating the onboard device.

The vehicle operation system 2 according to the present modification can prevent the onboard device 200 from being unintentionally operated.

Although the auxiliary operation device 40 according to the embodiment and the auxiliary operation device 60 according to the modification are disposed at the end of the tiltable longitudinal member 12 of the main operation device 10, the action detecting unit 41 of the auxiliary operation device 40 and the first and the second action detecting units 61 and 67 of the auxiliary operation device 60 may be disposed at an end of an immovable longitudinal member 12 that cannot perform, for example, a tilt action. The immovable longitudinal member 12 is an elongated member projecting and extending from the steering column 101 with one end being fixed inside the steering column 101. At least one of a combination of the immovable longitudinal member 12 and the action detecting unit 41 and a combination of the immovable longitudinal member 12 and the first and the second action detecting units 61 and 67 may be provided to at least one of the right side and the left side of the steering column 101 in the lateral direction of the vehicle. Such a combination may be substituted for the combination of the main operation device 10 and the auxiliary operation device 40 or 60 described above and may be disposed together with the combination of the main operation device 10 and the auxiliary operation device 40 or 60.

Although the non-detecting regions 46A$_1$ and 46A$_2$ in the embodiment are formed on a member different from the one on which the contact operation region 42A is formed, and cover a part of the contact operation region 42A, the non-detecting regions 46A$_1$ and 46A$_2$ may be formed on the same member as that on which the contact operation region 42A is formed. For example, the circular blocking surface that is the exposed portion of the contact operation member 43A may include a recessed portion recessed toward the steering column 101 along a radial direction to be used as the contact operation region 42A, and the other portion may be used as the non-detecting regions $46A_1$ and $46A_2$. The non-detecting regions may be formed on the same member as that on which the contact operation region is formed, or may be formed on a member different from the one on which the contact operation region is formed.

The vehicle operation system according to the present invention can prevent an onboard device from being unintentionally operated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle operation system comprising:
    a longitudinal member that is projected and extended from a steering column;
    an action detecting unit that is disposed at an end of the longitudinal member in an extending direction, and detects a contact operation as an operation form allocated to a working form that an onboard device has;
    a rotational action detecting unit that is disposed to the longitudinal member closer to the steering column than the action detecting unit is, includes a rotating member rotatably arranged about an axis line of the longitudinal member and surrounding the longitudinal member in a circumferential direction, and detects a rotational operation on the rotating member as a rotational operation form allocated to a working form that the onboard device has; and
    a controller that controls the onboard device in accordance with the operation form detected by the action detecting unit and the rotational operation form detected by the rotational action detecting unit, wherein
    the action detecting unit includes a contact operation detecting region in which the operation form is detected, and a non-detecting region that projects in the extending direction beyond the contact operation detecting region and in which the operation form is not detected.

2. The vehicle operation system according to claim 1, wherein
    the action detecting unit includes a contact sensor capable of detecting an object in contact with the contact operation detecting region and a direction in which the object moves, and detects the contact operation as the operation form with the contact sensor.

3. The vehicle operation system according to claim 2, wherein
    the contact operation detecting region includes a first contact operation detecting region, a second contact operation detecting region, and a third contact operation detecting region each having a planar surface,
    the first contact operation detecting region is interposed between a pair of non-detecting regions,
    the second contact operation detecting region is disposed opposite to the first contact operation detecting region relative to one of the pair of the non-detecting regions,
    the third contact operation detecting region is disposed opposite to the first contact operation detecting region relative to the other one of the pair of the non-detecting regions, and
    the second contact operation detecting region and the third contact operation detecting region are each sloped in a direction away from the first contact operation detecting region toward the steering column.

4. The vehicle operation system according to claim 3, wherein
    at least a combination of the longitudinal member and the action detecting unit is provided to at least one of a left side and a right side of the steering column in a lateral direction of a vehicle.

5. The vehicle operation system according to claim 3, further comprising:
    a main operation device including a lever operation unit that includes the longitudinal member and a lever operation detecting unit that detects a tilt direction of the longitudinal member in a tilt action with an end of the longitudinal member close to the steering column as a fulcrum, the main operation device operating the onboard device or another onboard device different from the onboard device allocated to the tilt direction of the tilt action that corresponds to an operation direction of the longitudinal member; and
    an auxiliary operation device including the action detecting unit.

6. The vehicle operation system according to claim 2, wherein
    at least a combination of the longitudinal member and the action detecting unit is provided to at least one of a left side and a right side of the steering column in a lateral direction of a vehicle.

7. The vehicle operation system according to claim 2, further comprising:
    a main operation device including a lever operation unit that includes the longitudinal member and a lever operation detecting unit that detects a tilt direction of the longitudinal member in a tilt action with an end of the longitudinal member close to the steering column as a fulcrum, the main operation device operating the onboard device or another onboard device different from the onboard device allocated to the tilt direction of the tilt action that corresponds to an operation direction of the longitudinal member; and
    an auxiliary operation device including the action detecting unit.

8. The vehicle operation system according to claim 1, wherein
    the action detecting unit includes the contact operation detecting region outwardly exposed at the end in the extending direction, and a movable member that is movable by the contact operation on the contact operation detecting region, and detects movement of the movable member as the operation form.

9. The vehicle operation system according to claim 8, wherein
    at least a combination of the longitudinal member and the action detecting unit is provided to at least one of a left side and a right side of the steering column in a lateral direction of a vehicle.

10. The vehicle operation system according to claim 8, further comprising:
    a main operation device including a lever operation unit that includes the longitudinal member and a lever operation detecting unit that detects a tilt direction of the longitudinal member in a tilt action with an end of the longitudinal member close to the steering column as a fulcrum, the main operation device operating the onboard device or another onboard device different from the onboard device allocated to the tilt direction of the tilt action that corresponds to an operation direction of the longitudinal member; and an auxiliary operation device including the action detecting unit.

11. The vehicle operation system according to claim 1, wherein at least a combination of the longitudinal member and the action detecting unit is provided to at least one of a left side and a right side of the steering column in a lateral direction of a vehicle.

12. The vehicle operation system according to claim 11, further comprising:

a main operation device including a lever operation unit that includes the longitudinal member and a lever operation detecting unit that detects a tilt direction of the longitudinal member in a tilt action with an end of the longitudinal member close to the steering column as a fulcrum, the main operation device operating the onboard device or another onboard device different from the onboard device allocated to the tilt direction of the tilt action that corresponds to an operation direction of the longitudinal member; and an auxiliary operation device including the action detecting unit.

13. The vehicle operation system according to claim 1, wherein the contact operating detecting region is a flat surface.

14. The vehicle operation system according to claim 13, wherein non-detecting region includes a pair of non-detecting parts that extend away from the flat surface of the flat surface of the contact operation detecting region, and each of the non-detecting parts includes a second flat surface that is parallel to and spaced away from the flat surface of the contact operation detecting region.

15. The vehicle operation system according to claim 1, wherein the action detection unit further includes a contact operation member that has a cylindrical shape, the contact operation member includes the contact operation detecting region, and the non-detecting region, the contact operation detecting region includes a pair of straight sides and a pair of curved sides that connect respective ends of the straight sides to each other, and the pair of curved sides has a curvature that corresponds to the cylindrical shape of the contact operation member, the non-detecting region includes a first non-detecting part and a second non-detecting part, the first non-detecting part includes a first straight side and a first curved line that connecting with both ends of the first straight side, the first straight side is adjacent to one of the straight sides of the contact operation detecting region, and the first curved line has a curvature that corresponds to the cylindrical shape of the contact operation member, and the second non-detecting part includes a second straight side and a second curved line that connecting with both ends of the second straight side, the second straight side is adjacent to a different one of the straight sides of the contact operation detecting region, and the second curved line has a curvature that corresponds to the cylindrical shape of the contact operation member.

16. A vehicle operation system comprising:

a longitudinal member that is projected and extended from a steering column;

an action detecting unit that is disposed at an end of the longitudinal member in an extending direction, and detects a contact operation as an operation form allocated to a working form that an onboard device has;

a rotational action detecting unit that is disposed to the longitudinal member closer to the steering column than the action detecting unit is, includes a rotating member rotatably arranged about an axis line of the longitudinal member and surrounding the longitudinal member in a circumferential direction, and detects a rotational operation on the rotating member as a rotational operation form allocated to a working form that the onboard device has; and a controller that controls the onboard device in accordance with the operation form detected by the action detecting unit and the rotational operation form detected by the rotational action detecting unit, a main operation device including a lever operation unit that includes the longitudinal member and a lever operation detecting unit that detects a tilt direction of the longitudinal member in a tilt action with an end of the longitudinal member close to the steering column as a fulcrum, the main operation device operating the onboard device or another onboard device different from the onboard device allocated to the tilt direction of the tilt action that corresponds to an operation direction of the longitudinal member; and an auxiliary operation device including the action detecting unit, wherein the action detecting unit includes a contact operation detecting region in which the operation form is detected, and a non-detecting region that projects in the extending direction beyond the contact operation detecting region and in which the operation form is not detected.

17. The vehicle operation system according to claim 16, wherein at least one combination of the main operation device and the auxiliary operation device is provided to at least one of a left side and a right side of the steering column in a lateral direction of a vehicle.

18. A vehicle operation system comprising:

a longitudinal member that is projected and extended from a steering column;

an action detecting unit that is disposed at an end of the longitudinal member in an extending direction, and detects a contact operation as an operation form allocated to a working form that an onboard device has;

a rotational action detecting unit that is disposed to the longitudinal member closer to the steering column than the action detecting unit is and disposed at a position different from the action detecting unit, includes a rotating member rotatably arranged about an axis line of the longitudinal member and surrounding the longitudinal member in a circumferential direction, and detects a rotational operation on the rotating member as a rotational operation form allocated to a working form that the onboard device has; and a controller that controls the onboard device in accordance with the operation form detected by the action detecting unit and the rotational operation form detected by the rotational action detecting unit, wherein the action detecting unit includes a contact operation detecting region in which the operation form is detected, and a non-detecting region that projects in the extending direction beyond the contact operation detecting region and in which the operation form is not detected.

* * * * *